R. C. BERRY.
POWER HACKSAW.
APPLICATION FILED MAR. 13, 1912.
1,056,880.
Patented Mar. 25, 1913.
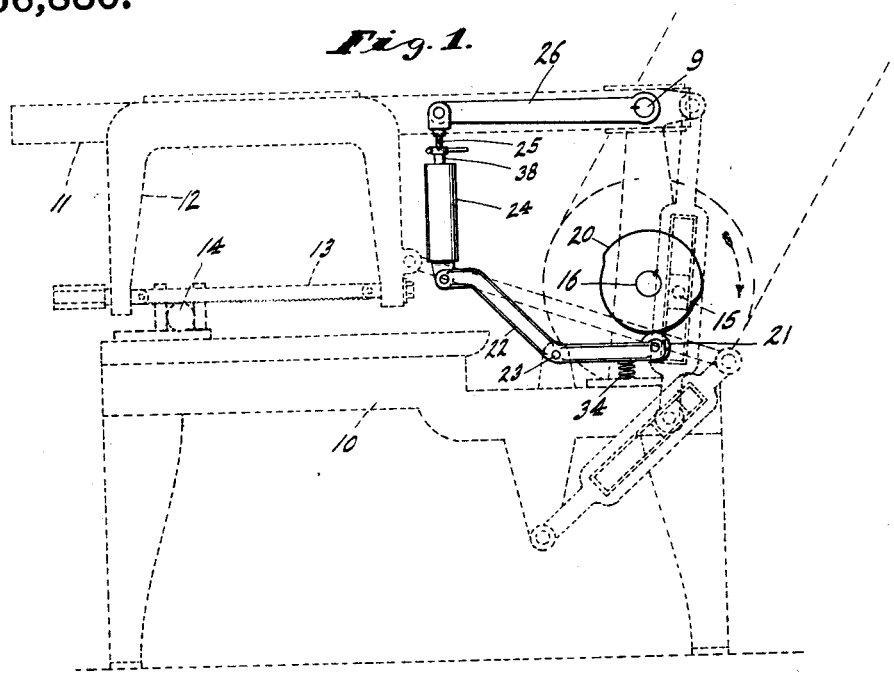
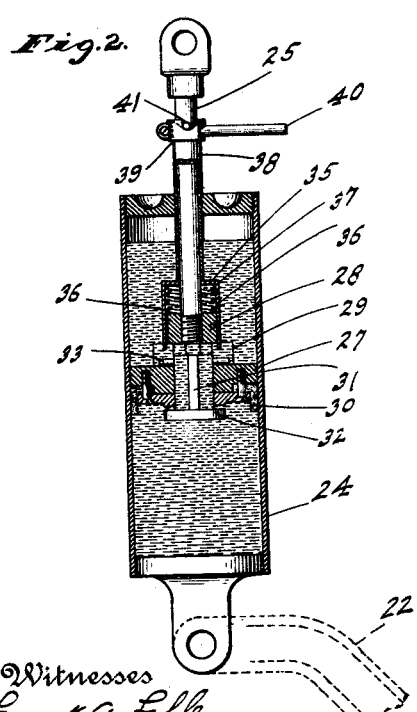
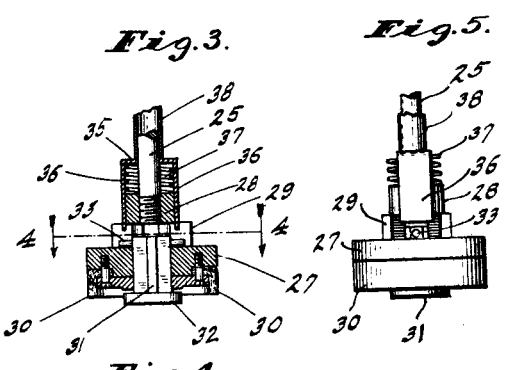
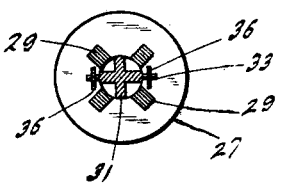
Witnesses
Frank A. Fahl
J. Casper
Inventor
Robert C. Berry,
By Arthur M. Harrod
Attorney

UNITED STATES PATENT OFFICE.

ROBERT C. BERRY, OF INDIANAPOLIS, INDIANA.

POWER-HACKSAW.

1,056,880.

Specification of Letters Patent.

Patented Mar. 25, 1913.

Application filed March 13, 1912. Serial No. 683,577.

*To all whom it may concern:*

Be it known that I, ROBERT C. BERRY, a citizen of the United States, residing at Indianapolis, in the county of Marion and State of Indiana, have invented a new and useful Power-Hacksaw, of which the following is a specification.

It is the object of my invention to prevent the wearing of the saw teeth of a machine saw during the return or non-cutting movement thereof.

According to my invention, the saw is lifted during its return or non-cutting movement, and the lifting is uniform. This is obtained by connecting the lifting mechanism with the saw-supporting mechanism by means which operates to lift the saw a predetermined distance, regardless of the vertical position of the saw at the time the lifting action is begun. This connecting means comprises a dash-pot which allows free movement of the fluid within it in one direction only from one side of the piston to the other.

The various novel features of my invention will appear from the description and drawings, and will be particularly pointed out in the claims.

In the drawing, Figure 1 is an elevation of one form of machine hack-saw embodying my invention; Fig. 2 a longitudinal section through the dash-pot; Fig. 3 a sectional view of the dash-pot piston and associated parts; Fig. 4 a section on the line 4—4 of Fig. 3, but with the valve locked open; and Fig. 5 is a side elevation of the parts shown in Fig. 3.

Mounted on a shaft 9 in the main frame 10 is a saw guide 11, on which is slidably mounted a saw frame 12 provided with a hack-saw blade 13, shown as about to begin to cut the bar 14. The saw frame 12 is reciprocated in any suitable manner, as in the manner covered by my Patent No. 907,445, from a crank pin 15 on a driving shaft 16.

A cam 20 is fixed on the driving shaft 16, and coöperates with a roller 21 on one end of a lever 22 pivoted at 23 on the main frame 10. A dash-pot casing 24 is pivoted to the end of the lever 22 opposite the roller 21, the piston rod 25 of this dash-pot being suitably connected to the saw guide 11, as by being pivoted to an arm 26 fixed to the shaft 9 carrying said saw guide. The lower end of the piston rod 25 is suitably attached to the piston 27, as by being screw-threaded into a nut 28 integrally connected with the piston 27 by four arms 29. The piston 27, which is provided with a flexible piston ring or packing 30 in the usual manner, is perforated centrally to receive the stem 31 of a valve 32, such valve being suspended at a slight distance below the piston 27 by a pin 33 extending through the valve stem 31 above said piston. The coöperating faces of the valve 32 and the piston 27 are arranged to fit nicely when the valve is raised.

In operation, the cam 20 forces the roller 21 downward and the dash-pot casing upward at the completion of the forward or cutting stroke of the saw 13. This upward movement closes the valve 32 after a very small but always uniform movement, depending upon the distance allowed between the valve 32 and its seat; and the continued upward movement of the casing 24 causes the piston 27 to move with it, thus tilting the arm 26, and therefore the saw guide 11, to lift the saw blade 13 slightly. The saw blade 13 remains lifted during its backward movement, at the completion of which the cam 20 allows the roller 21 to rise, under the influence of the spring 34, and the parts which before were lifted, to fall. The valve 32 now opens, and remains open during the cutting stroke, allowing the saw blade 13 and its supporting parts to descend slowly as the saw deepens the cut.

In order to allow the ready vertical adjustment of the saw frame 12 and the saw guide 11, as for the purposes of changing the saw or the work, means is provided for holding the valve 32 in open position. This means preferably comprises a metallic plate 35 sleeved on the piston rod 25 and having two fingers 36 extending downward, between the arms 29 which prevent the fingers from turning, toward the two ends of the pin 33. This plate is spring pressed upward by a coil spring 37 above the nut 28. A tube 38 bears on the upper side of the plate 35, and is provided at its upper end with a collar 39 and handle 40 whereby it may be turned. The upper surface of the collar 39 is notched and coöperates with a cross-pin 41 in the piston rod 25. By turning the handle 40, the sides of the notches in the collar 39 act as cams and force the tube 38, the plate 35, and the fingers 36 downward against the action of the spring 37 to bring the fingers 36 into engagement with the ends of the pin 33, thus locking the valve 32 open. This permits any desired relative movement between the piston 27 and the dash-pot casing 24 and allows the frame 11 to be tilted either upward or downward around its axis 9 to its limit of movement; however, for the upward movement of the saw frame 11, it is not necessary to hold the valve 32 open, as the pressure of the fluid within the dash-pot will do that. If it is desired to hold the parts in a raised position, the handle 40 is put in normal position to allow the valve 32 to close by the downward pressure of the lifted parts on the piston 27. By forcing the valve open, by the proper movement of the handle 40, the frame 11 may be returned to operating position.

What I claim as new is:

1. A machine saw, comprising a reciprocable saw frame, driving means comprising means for reciprocating said saw frame, and a mechanical connection between the driving means and said saw frame for raising the latter in its return movement, said connection comprising a dash-pot.

2. A machine saw, comprising a pivoted saw guide, a saw frame reciprocable on said guide, driving means comprising means for reciprocating said saw frame on said saw guide, and a connection between said driving means and said saw guide for tilting the latter to lift the saw frame during the return movement thereof, said means comprising a cam and a dash-pot, one member of which dash-pot is mechanically connected to said saw guide and the other to the reciprocating means.

3. A machine saw, comprising a pivoted saw guide, a saw frame reciprocable on said guide, driving means comprising means for reciprocating said saw frame on said saw guide, and a connection between said driving means and said saw guide for tilting the latter to lift the saw frame during the return movement thereof, said means comprising a cam and a dash-pot, one member of which dash-pot is mechanically connected to said saw guide and the other to the reciprocating means, said dash-pot being provided with a valve which closes when the action of the cam tends to move the two dash-pot members relatively to each other in the direction to lift the saw frame.

4. A machine saw, comprising a pivoted saw guide, a saw frame reciprocable on said guide, driving means comprising means for reciprocating said saw frame on said saw guide, a connection between said driving means and said saw guide for tilting the latter to lift the saw frame during the return movement thereof, said means comprising a cam and a dash-pot, one member of which dash-pot is mechanically connected to said saw guide and the other to the reciprocating means, said dash-pot being provided with a valve which closes when the action of the cam tends to move the two dash-pot members relatively to each other in the direction to lift the saw frame, and manually operated means for opening said valve.

5. A machine saw, comprising a pivoted saw guide, a saw frame reciprocable on said guide, driving means comprising means for reciprocating said saw frame on said saw guide, a connection between said driving means and said saw guide for tilting the latter to lift the saw frame during the return movement thereof, said means comprising a cam and a dash-pot, one member of which dash-pot is mechanically connected to said saw guide and the other to the reciprocating means, said dash-pot being provided with a valve which closes when the action of the cam tends to move the two dash-pot members relatively to each other in the direction to lift the saw frame, and manually operated means for locking said valve open.

6. In a power hack-saw, the combination with the saw-carrying member and the power train for operating it, of a dash-pot comprising two coöperating members one containing a liquid and the other forming a piston submerged in said liquid, a valve for limiting flow of liquid in one direction, a connection between one of the dash-pot members and the saw-carrying member, a support for the other dash-pot member movable in the line of the dash-pot, and means operated by the power train for the hack-saw for reciprocating said support, for the purpose set forth.

In witness whereof, I, have hereunto set my hand and seal at Indianapolis, Indiana, this 9th day of March, A. D. one thousand nine hundred and twelve.

ROBERT C. BERRY. [L. S.]

Witnesses:
ARTHUR M. HOOD,
FRANK A. FAHLE.